Jan. 15, 1957  G. S. LAMPHERE  2,777,714
CLAMP-LOCK SWIVEL ELBOW
Filed June 15, 1953

INVENTOR:
George S. Lamphere
By Herbert E. Metcalf
His Patent Attorneys

2,777,714
CLAMP-LOCK SWIVEL ELBOW

George S. Lamphere, Torrance, Calif., assignor to Northrop Aircraft, Inc., Hawthorne, Calif., a corporation of California Application June 15, 1953, Serial No. 361,665

1 Claim. (Cl. 285—98)

My invention relates to the field of rotary joints and more particularly to an improved means of joining two pipes together effective to allow rotary motion of one with respect to the other and to preclude any fluid leakage from the pipe assemblage. Joints of the type described when used to connect pipes at right angles to one another are generally referred to as swivel elbows.

It is a specific object of my invention to provide a freely rotating swivel elbow effective to withstand the effects of high and low pressure fluid flow within the adjoined conduits and in addition capable of resisting vibration and other loads tending to cause rocking of the parts of the joint with resultant rapid deterioration of the leakproof characteristics of the joint.

A further object of my invention is to provide a swivel elbow employing a minimum number of leakproof elastic O-rings as packing members while obtaining the additional feature of ability to withstand stresses tending to rock or tilt the parts of the joint with respect to one another.

Other objects and uses will manifest themselves from the subsequent description and drawings forming a part of the specification wherein.

Figure 1:
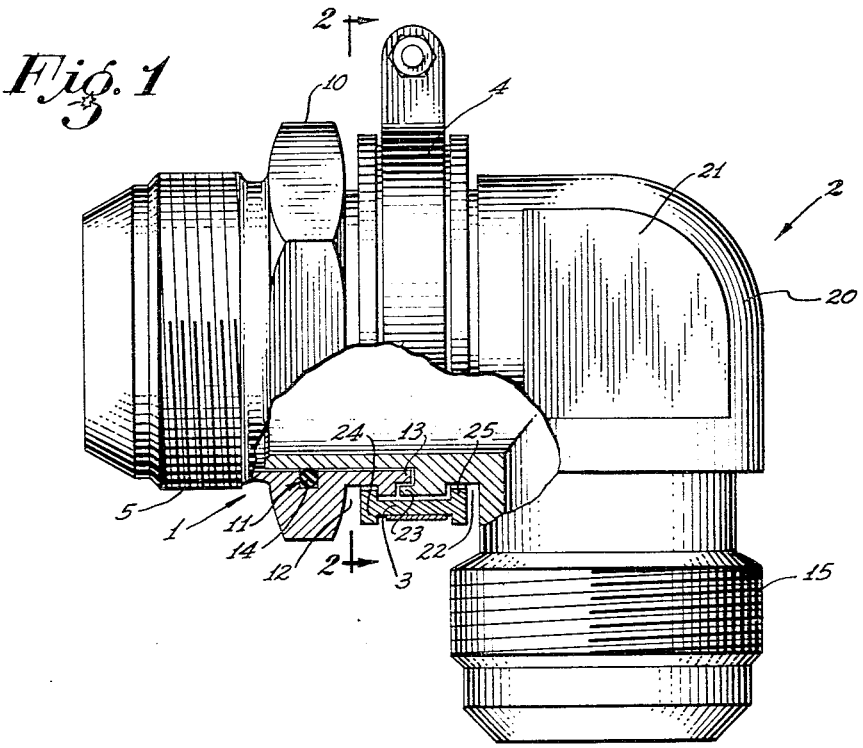
Figure 1 is a side elevation of the elbow as assembled, a portion being broken away to show interior arrangement.
Figure 2:
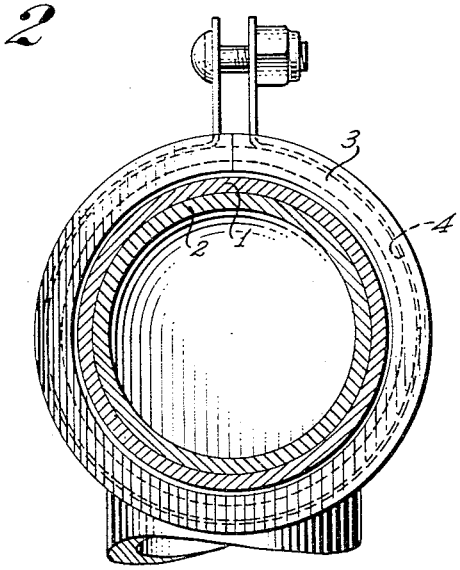
Figure 2 is a cross-sectional view along the lines 2—2 of Figure 1.

For a detailed description of my invention, reference is had to the drawings in which conduit member 1 is connected to conduit member 2 by the split ring 3 and a clamp strap 4. The conduit member 1 is provided with external threads 5 at one end to enable the member 1 to be threadably engaged with a pipe line (not shown) and formed with a hexagonal portion 10 having a groove 11 therein and being integral with the member 1. An external peripheral groove 12 and a lip 13 are made in the conduit member 1 beyond the hexagonal portion. Disposed within the groove 11 is an elastic O-ring 14 to provide packing against fluid leakage. Conduit member 2 is formed with external threads 15 at one end and an elbow section 20 intermediate the respective ends of said member. The elbow section 20 is provided with flat surfaces 21 to enable said member 2 to be gripped by a "Crescent" wrench. The other end of member 2 is formed with an external groove 22 and a lip 23 so as to interfit with member 1. The split ring 3 is fabricated with peripheral flanges 24 and 25 which seat within grooves 11 and 22. The clamp 4 is disposed around the ring 3 within the channel formed by virtue of the ring flanges 24 and 25. The result of the described construction is that while parts 1 and 2 of the swivel elbow may be rotated freely with respect to each other, the parts are securely steadied against relative rocking movement by the axially spaced bearing surfaces provided by the O-ring and the lip 13 and groove 12 arrangement.

The operation of my invention follows. The elastic O-ring 14 is seated within the groove 11 and the two conduit members 1 and 2 tentatively held together with the respective lips 13 and 23 in close proximity. The split ring 3 is disposed around the members 1 and 2 in the grooves 12 and 22, the ring flanges precluding separation of the component members 1 and 2, the clamping strap 4 holding the ring 3 in place, the outer edges of flanges 24 and 25 project sufficiently to prevent lateral displacement of the clamp strap from the split ring 3. Since a certain small clearance is provided between the members 1 and 2, swivel movement is readily accomplished. Fluid flowing through the small clearance contacts the elastic O-ring 14 causing it to be compressed and deformed, thus blocking the clearance track from the fluid. Hence, no fluid is able to move past the O-ring 14. The labyrinth fitting of the members 1 and 2 and the ring 3, enables the conduit members 1 and 2 to maintain axial alignment because of the support provided for the members of the joint by the inter-engaging parts 13 and 23 which are spaced from the O-ring 14. The joint is thus securely held against transverse deflection even under the severe vibration experienced in airplanes. The integral nut 10 on member 1 enables said member 1 to be held when a pipe is to be threadably secured thereto. Similarly the small flats 2 on member 2 provide the same function.

Disassembly of the elbow joint to change the O-ring 14 is accomplished with a minimum time expenditure by removing the clamp strap 4 and the ring 3.

The swivel elbow assembly is designed in accordance with the O-ring which is selected. As presently tested the assembly is effective to prevent any leakage when the condition of fluid flow is at a pressure as low as $\frac{1}{10}$ p. s. i. and the temperature is at —65 degrees F. Similarly the assembly will resist separation at comparatively high pressures in the order of 3000 p. s. i. and at a temperature of 165° F.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A swivel pipe joint comprising: a first tubular member; a second tubular member telescoped thereinto and freely rotatable relative thereto; means defining a circumferential groove in one of the opposed surfaces of said members adjacent the inner end of said second member; a resilient O-ring packing in said groove and contacting the bottom thereof and the other of said surfaces to provide a seal between the latter, the contact between said ring and said other surface constituting a first bearing engagement between said members; an exterior enlargement on said second member outside and adjacent the outer end of said first member; an exterior enlargement on said first member adjacent said outer end thereof, said enlargements defining oppositely facing exterior shoulders on said members; means defining an axially facing circumferential groove in said second member enlargement opposed to said first member end; a lip on said first member received and rotatable in said groove and engaging with the outer side wall thereof to constitute a second bearing engagement between said members spaced axially from said first bearing engagement; and a clamping ring detachably engaged with said shoulders to retain said members in their telescoped relation while permitting rotation therebetween.

References Cited in the file of this patent

UNITED STATES PATENTS

| | | |
|---|---|---|
| 1,125,642 | Blanchard | Jan. 19, 1915 |
| 2,226,914 | Sharon | Dec. 31, 1946 |
| 2,412,394 | Giles | Dec. 10, 1946 |
| 2,460,984 | Hill | Feb. 8, 1949 |
| 2,632,659 | Lee | Mar. 24, 1953 |
| 2,662,755 | Gerst | Dec. 15, 1953 |
| 2,676,039 | Habig | Apr. 20, 1954 |